United States Patent [19]

Gregory

[11] Patent Number: 4,564,370

[45] Date of Patent: Jan. 14, 1986

[54] IGNITION ARTICLE AND COMPOSITION FOR THE RAPID IGNITION OF COAL OR CHARCOAL FIRES

[76] Inventor: Edward F. Gregory, 11 Pine St., Wellesley, Mass. 02181

[21] Appl. No.: 694,803

[22] Filed: Jan. 25, 1985

Related U.S. Application Data

[63] Continuation of Ser. No. 578,559, Feb. 9, 1984, abandoned, which is a continuation-in-part of Ser. No. 506,500, Jun. 21, 1983, abandoned.

[51] Int. Cl.4 .......... C10L 11/06

[52] U.S. Cl. .......... 44/38; 44/41

[58] Field of Search .......... 44/38, 40, 41

[56] References Cited

U.S. PATENT DOCUMENTS

| | | | |
|---|---|---|---|
| 1,366,258 | 1/1921 | Hager | 44/40 |
| 2,094,661 | 10/1937 | Macleay et al. | 44/41 |
| 2,933,378 | 4/1960 | Mustin et al. | 44/38 X |
| 3,279,453 | 10/1966 | Norehad et al. | 44/40 X |
| 3,759,675 | 9/1973 | Lazarus et al. | 44/38 |

*Primary Examiner*—Carl F. Dees

*Attorney, Agent, or Firm*—Richard P. Crowley

[57] ABSTRACT

An article and composition for the rapid ignition of coal or charcoal-type fires in a coal stove or a charcoal grill, which composition comprises a tray composed of a stiffened, combustible, cellulosic, fibrous material impregnated with a solidifiable, combustible hydrocarbon material, such as a paraffin wax, and a plurality of charcoal-type briquettes optionally impregnated with a combustible hydrocarbon material, such as paraffin wax, the charcoal briquettes positioned in the tray, so that the article may be ignited to provide a starter fire for a charcoal-type grill fire. Optionally the tray may include a pressed wood fiber board material therein.

15 Claims, 3 Drawing Figures

IGNITION ARTICLE AND COMPOSITION FOR THE RAPID IGNITION OF COAL OR CHARCOAL FIRES

REFERENCE TO PRIOR APPLICATION

This is a continuation application of application Ser. No. 578,559, filed Feb. 9, 1984, (now abandoned) which is a continuation-in-part of U.S. Ser. No. 506,500, filed June 21, 1983 (now abandoned), hereby incorporated by reference in its entirety.

BACKGROUND OF THE INVENTION

It is recognized that both coal and charcoal-type fires are difficult to start and to maintain for satisfactory combustion. For example, the ignition of charcoal-type briquettes in a charcoal grill has been a source of annoyance; and typically, requires the employment of a volatile combustible material sprayed on the charcoal-type briquettes or the use of paper or other material to start the charcoal briquettes to ignite in a satisfactory manner; and thereafter, additional briquettes are added to maintain a satisfactory charcoal fire. Coal fires are even more difficult to start and to maintain satisfactory combustion. Typically, a coal fire is started by placing a small amount of coal on top of an existing wood fire or charcoal fire or by employing wood to start the coal and then the adding starter coal to the wood fire, which is an additive process that normally continues until a good coal fire has been developed in the combustion chamber of the coal stove. Thus, the ignition of both coal and charcoal-type fires is generally time consuming, somewhat cumbersome, and associated with some degree of difficulty in order to start or maintain a fire of satisfactory combustion characteristics. It is thus desirable to provide for an ignition composition and method of preparing and using the composition which permits the rapid ignition of either a coal or charcoal fire in a coal stove or a charcoal grill.

SUMMARY OF THE INVENTION

My invention relates to a novel ignition article and composition, to a method of preparing the article and composition, and to the method of using such article and composition for the rapid ignition of a coal or charcoal fire in a rapid, safe, and effective manner. My invention also concerns an article which optionally, with the addition of other material may be employed for the rapid ignition of a coal fire.

The parent application describes a coal ignition composition and method for use wherein the ignition composition is employed for the rapid ignition of a coal fire and a coal stove. The ignition composition and the parent application comprises a solid admixture of lignite and pea-type coal. The pea coal and the lignite are held together in a solid admixture by the employment of a combustible, solidifiable material, such as a paraffin wax composition poured thereover to bind the pea coal and the lignite together in that mixture. The coal ignition composition is used by placing it in the grate of a coal stove and the composition ignited and later, nut coal added to the top surface of the ignition composition after the combustion has been started.

Optionally, and desirably, the ignition compostion is placed in a mesh-type basket, so that once ignition is started, the ignition composition may be dumped out of the basket onto the grate and the fresh nut coal added to the top to maintain a satisfactory fire. Coal is added in layers allowing each successive layer to become ignited, but not consumed until a satisfactory coal fire is achieved. The mesh-type basket is employed in order to provide for rapid oxidization of the ignition composition. Generally, the ignition composition is first started by employing a combustible material, such as paper placed beneath the mesh basket containing the ignition composition, so that a progressing ignition of the paper and the paraffin and subsequently the lignite and then the pea coal occurs to build up a fire in a rapid manner, so that the nut coal may be added later. After a satisfactory quantity of hot coals is achieved, the user employs tongs or a similar holding device and lifts the mesh basket, empties the contents of the basket into the grate and the basket is then removed for future use.

A practical alternative to conventional methods of igniting in a rapid manner or igniting a coal or charcoal fire has been discovered through the employment of a rapid ignition article and composition. The article comprises a tray adapted to retain charcoal briquettes therein and comprising upright sides and a bottom. The tray may have a flat bottom surface or in one embodiment have a bottom surface of individually formed cavities therein to retain each briquette. The tray is dimensioned to retain the desired number of charcoal briquettes, typically 6 to 18 and generally 6 to 12 in one or two layers with the height of the upright sides sufficient to surround and prevent the briquettes from lateral movement. The tray is composed of a generally stiffened, combustible, cellulosic fiber, such as a shaped or formed wood fiber, cardboard or paper rigid sheet material which has been impregnated with a combustible material, particularly a hydrocarbon combustible material, such as a solidifiable-type material, such as a combustible wax like a low melting point combustible paraffin-type wax; for example, having a melting point of from about 110° to 145° F. The shaped thin fibrous sheet material is substantially impregnated with the combustible, solidifiable material to aid in the rapid combustion of the material and typically has a low ignition temperature. The sheet material is in one embodiment characterized by being formed of a plurality of spaced apart, formed pocket-type cavity sections therein, so as to form a stiffened egg crate-type fashion material with briquette-receiving pockets therein.

The fibrous material is generally, uniformly impregnated by the combustible material, such as the paraffin wax, by submersion of the fibrous material in the combustible material; for example, as in an organic volatile solvent solution thereof or a water solution or typically, merely by melting the wax, and submerging the material therein for a period of time to permit the fibrous material to soak up and to be substantially and uniformly impregnated with the wax material. Other combustible material, of course, may be employed, such as the use of a liquid hydrocarbon combustible-type oil; however, the solidifiable, highly combustible material, such as wax and wax blends, are particularly preferred, since the wax in addition to making the fibrous material more combustible also aids in stiffening the material into the desired shape and also provides an esthetically pleasing appearance of a high or shiny-type gloss surface.

The tray composed of the sheet material generally contains and is impregnated with greater than 30 percent by weight of the tray and typically from 40 to 90 percent; for example, 50 to 80 percent by weight. The amount of wax impregnated often depends on the degree of of the sheet material of the tray. If desired, additional wax may be used for combustibility, such as by forming a separate layer; for example, ⅛–½" of wax in the tray. The charcoal briquettes may be placed or embedded in the top surface of the wax layer.

If desired, the solidifiable-type combustible material employed, such as wax, may be dyed or colored to provide a desired color through the final wax impregnated stiffened fibrous material. Further, the combustible material employed to impregnate the fibrous material may contain minor amounts of various oxidizing additives, such as nitrate or chlorate salts to aid in combustion or if desired, minor amounts of other additives or fibrous material, such as cellulosic material, sawdust, coal dust, wood chips, paper scraps, charcoal dust, agents, such as wood chips to add smoked flavor or combustible particulate material to aid in the combustibility. Typically, additives are used in small amounts generally from 5 to 20 percent by weight of the combustible material.

The impregnated stiffened fibrous material may be formed into a tray with an open top either before or after impregnation. Cavities are formed in the tray typically in rectangular or oval-type shape, so as to fit in and about a relatively snug manner, the charcoal-type briquets placed in each of the hollow cavities. For example, the stiffened fibrous material may be composed of a generally rectangular fibrous sheet material or cellulosic fibers of about 1/32 to ¼ inch in thickness formed under pressure while wet and aided by a small amount of a binder, such as a latex or resin in the mixture to serve as a binder and then dryed and formed under pressure to form a small rectangular shape sheet material having from 6 to 18 typically 12 hollow briquette-receiving cavities therein, 4 across and 3 deep.

The charcoal-type briquettes used are of the same or general-type briquettes which are employed in the charcoal briquette fire, the charcoal briquettes may be composed of charcoal or lignite and moulded, extruded or otherwise formed into a desired shape, so as to fit into the tray and the cavities. The charcoal briquettes may be placed in the cavities and retained therein by employing a shrink-wrappable polyethylene or polyolefin-type thin material wrapping around the fibrous sheet material. The briquettes, for example, may also be retained in position within the individual hollow cavities or to the flat bottom of the tray by the use of a small amount of an adhesive, such as a polyvinyl acetate-type adhesive placed in the bottom of each of the cavities or tray surface, so that when the charcoal briquettes are placed in the tray, the charcoal briquettes are adhesively retained in position or if desired, the charcoal briquettes may just be placed in the cavities or in the tray in a loose manner and retained by the surrounding packaging material.

Preferably, the charcoal briquettes may be employed alone or with other combustible material and more particularly and optionally, the charcoal-type briquettes may also be impregnated with a combustible material, such as a hydrocarbon-type material, and more particularly, a solidifiable-type material, such as a solidifiable paraffin wax or a blend of waxes to make the charcoal briquettes more combustible. Typically, the combustible material used to impregnate the charcoal briquettes should have a lower combustion temperature than the charcoal briquette. The charcoal briquettes may be impregnated in the same manner as the fibrous material by submerging the briquettes in a solution of the combustible material or in a moulten mixture of the combustible material for a sufficient time to permit impregnation of the porous briquette. Thus, for example, the briquette may comprise from 5 to 50 percent by weight of a combustible material, such as from 10 to 30 percent by weight of a paraffin wax to aid in the rapid ignition process. The combustible material, typically an inexpensive-type wax or wax-like material should be subject to easy melting at low flame, and on cooling to crystallize into a hard solidified form. Generally, an excess of wax should not be employed beyond what amount is required for combustion, since it is not desirable to have the wax accumulate in use in the ash tray of the coal stove or the bottom of the charcoal grill.

In operation the ignition composition is used for the rapid ignition of a charcoal fire by placing the stiffened wax impregnated fibrous sheet open tray, with or without a top section, containing the charcoal briquettes within a charcoal grill and then igniting one or more corners of the impregnated sheet material of the tray which will then ignite the retained charcoal briquettes. On such ignition, then additional charcoal briquettes may be added to ensure the continuance and maintenance of a satisfactory fire.

However, where the ignition article and composition is employed for the rapid ignition of a coal fire in a coal stove, then it is desirable to provide additional combustible components to aid in the ignition. In such cases it is desirable to provide a combustible wood fiber pressed board-type material with the stiffened wax impregnated sheet material of the tray. Generally the pressed wood fiber board material is formed by joined fibers of cellulose or wood fibers, optionally with a small amount of charcoal or binder-like resin or latex material and then moulded under pressure into a hard compressed fiber board material. A pressed wood fiber board material manufactured by Seymour Manufacturing Company, Inc. of Seymour, Ind., has found to be particularly suitable for use in the invention.

The pressed wood material may contain a wax material such as paraffin wax admixed with the wood fiber during the manufacturing process or may be impregnated with moulten wax after manufacture. When the pressed wood material is impregnated after manufacture, the low porosity often permits only minor amounts of wax to be impregnated; for example, from 1 to 20 percent; for example 2 to 10 percent by weight of the pressed wood fiber board.

In order to provide for a rapid ignition, it is often desirable that the pressed fiber board material contain a plurality of generally uniformly spaced air holes formed or drilled therein or be used in broken form. The holes should be generally spaced apart and uniformly dispursed about the pressed wood material, such as to represent from 5 to 25 percent of the surface area of the material. The air holes and breaking of the board permit the more rapid ignition of the fiber board pressed material. The fiber board pressed material may vary in thickness as desired, but typically ranges from ¼ inch to ¾ inch in thickness. Due to the nature of the fiber board compressed wood material, the material generally will not accept much wax impregnation. However, combustible material, such as hydrocarbon materials and particularly wax may be added and admixed with the pressed wood fiber material in an amount up to 25 percent by weight or more during the pressing process in forming the fiber board pressed material, if desired, in order to add additional combustion characteristics to the pressed wood material.

In the operation of the ignition composition for starting a coal fire in a coal stove, the ignition article then comprises a lower pressed wood fiber board material and the wax impregnated tray containing charcoal briquettes therein, with the pressed wood board material either inside the tray on the bottom surface or outside the tray and secured or placed adjacent and beneath the tray. Optionally, the pressed wood may be secured to the upper surface of the pressed wood fiber board material by an adhesive, if desired, or merely packaged in a tightly wrapped packaging condition. The ignition material is then placed typically, but optionally, on rolled newspapers within a pan or a mesh-type basket, and inserted in the coal stove. Pea coal is then placed on top of the charcoal briquettes and the paper then ignited. The ignition of the tray provides for the ignition of the pressed wood material and the charcoal briquettes and subsequently, the pea coal. Once a good fire is started, additional coal, such as fresh nut coal is then added in order to maintain a coal fire of sastisfactory combustion characteristics.

If desired, the tray composed of the wax impregnated fibrous sheet material therein may be manufactured and then marketed and sold in nested form a plurality of the sheet materials nested together and then sold for the assembly by the home owner or user placing the wood charcoal, wax impregnated briquettes in the respective tray rather than having the article premanufactured and sold as a single unit.

My invention will be described for the purposes of illustration only in connection with certain embodiments; however, it is recognized that various changes and modifications may be made in the invention and in the method of preparation and use all falling within the spirit and scope of the invention.

DESCRIPTION OF THE EMBODIMENTS

Figure 1:
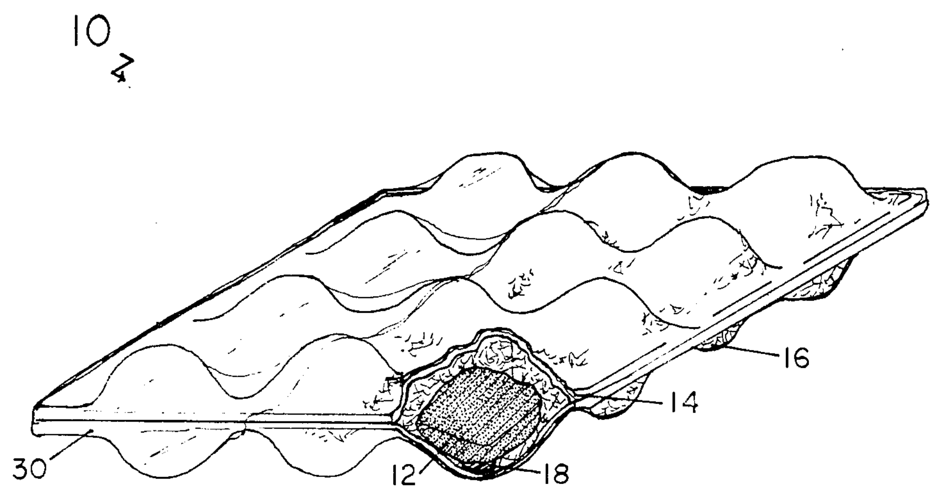
FIG. 1 is a perspective, partially sectionalized view of the rapid ignition article of the invention.

FIG. 1 shows a rapid ignition composition article 10 comprising a lower and matching upper stiffened sheet of a cardboard wood fiber sheet 14 impregnated with a paraffin wax 16 and having a plurality of spaced apart cavities therein, and which cavities contain charcoal briquettes 12 retained in the cavitiy by a small drop of adhesive 18 on the bottom sheet portion of the cavity. The composition and article 10 is retained and in condition for sale through the employment of a heat shrinkable transparent thin wrapping sheet of a polyethylene or polypropylene resin 30 shown in one corner of the article 10. As illustrated, the fibrous cardboard 14 is in egg carton-type form with the cavities shaped-like and dimensioned to retain the generally oval or rectangular shape of the charcoal briquettes; and for instance, may comprise a pressed cardboard-wood fiber material manufactured by Keyes Fiber Company of Stamford, Conn. The fiber board material 14 is impregnated with a low melting point petroleum-type paraffin wax by submerging the material into the melt for a period of about 5 minutes, so as to impregnate the sheet material with the paraffin wax, for example, from 5 to 30 percent by weight, the sheet removed and then cooled.

The charcoal briquettes 12 are typically moulded charcoal briquettes of the type normally purchased, such as a Kingsford wood-derived charcoal briquette, for example, having small amounts of lignite therein, and which briquettes may optionally be impregnated with the same or a different paraffin wax as employed in the fibrous cardboard 14. The briquettes may be held in position through the use of a polyvinyl acetate-type adhesive 18, by placing a drop within each cavity prior to dropping the charcoal briquette 12 into the cavity. Thereafter, the article 10 is shrink-wrapped with the olefin resin wrapping 30. As illustrated, the ignition composition has mating top and bottom formed sheets typically hinged together at one side, which arrangement provides ease in handling; however, if desired, the upper sheet may be removed and only the lower half containing the adhered briquettes used.

In use the shrink-wrap 30 is removed, the article 10 placed in a charcoal grill and one or more corner ignited and when the charcoal briquettes 12 become ignited, then additional briquettes supplied by the user are placed on top of the ignited charcoal briquettes to maintain a good fire. The article 10 may vary in size, and for example, may have a size from about 6 to 7 inches rectangular shape with about 1 inch round cavity with 4 rows and 3 ranks.

Figure 2:
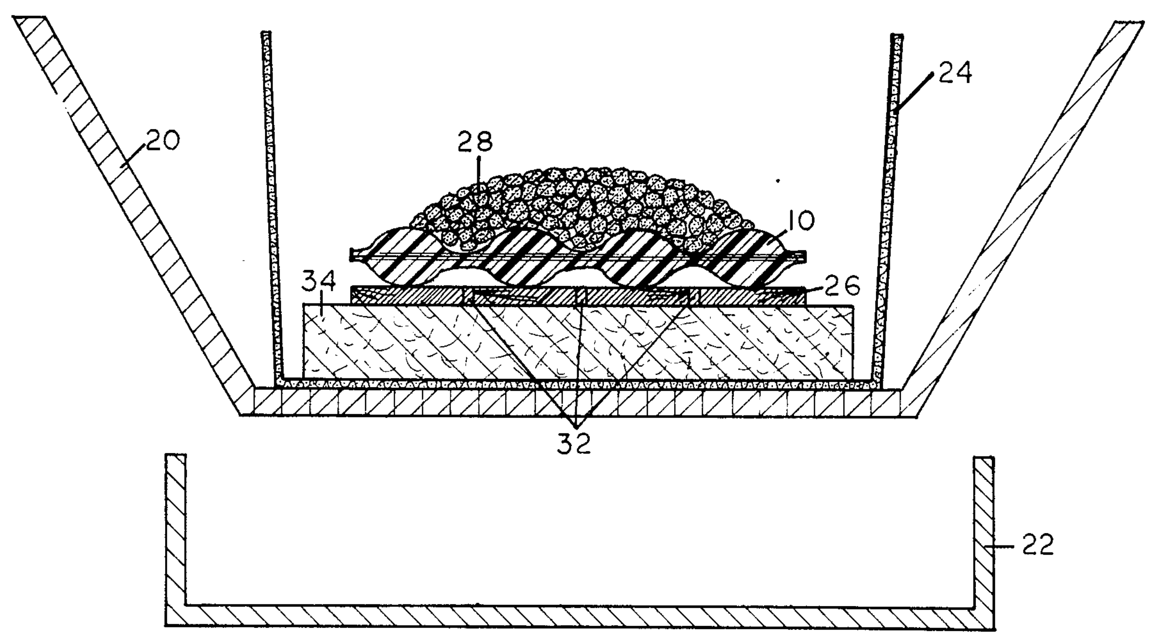
FIG. 2 is an illustrative sectional view of the ignition article of FIG. 1 employed in starting a coal fire.

FIG. 2 is an illustrative sectional view of a rapid ignition article employed for starting a coal fire in a coal stove having a grate 20 and an ash pan 22 beneath the grate, the grate containing an open mesh-type basket 24 and contained within the mesh-type basket is a pressed fibrous wood product 26; for example, as manufactured by Seymour Manufacturing Company, and which there is a plurality of holes 32 of about ½ to 1 inch drilled in the pressed wood block 26. The pressed wood block may comprise any shape; and as illustrated, would be approximately 6×8 inches. The rapid combustion article 10 of FIG. 1 is placed on top of the pressed wood block 26 and may optionally be secured in position for the use of an adhesive, such as polyvinyl acetate onto the top surface of the pressed wood block 26. A small amount of pea or nut-type coal 28 is placed on top of the charcoal or lignite-type wood briquettes. Beneath the pressed wood board 26 is rolled-up newspaper 34 or other easily combustible material.

Optionally, in operation, newspapers 34 are ignited leading to the progressive ignition of the fibrous pressed wood, the fibrous cardboard 14, the charcoal briquettes 12, and the pea or nut coal 28. When a satisfactory fire has been arranged, then the mesh-type basket is removed by tongs and the contents dumped in the grate 26 and then additional pea or nut coal is added to continue the combustion of the fire. The use of the mesh-type basket is optional.

Figure 3:
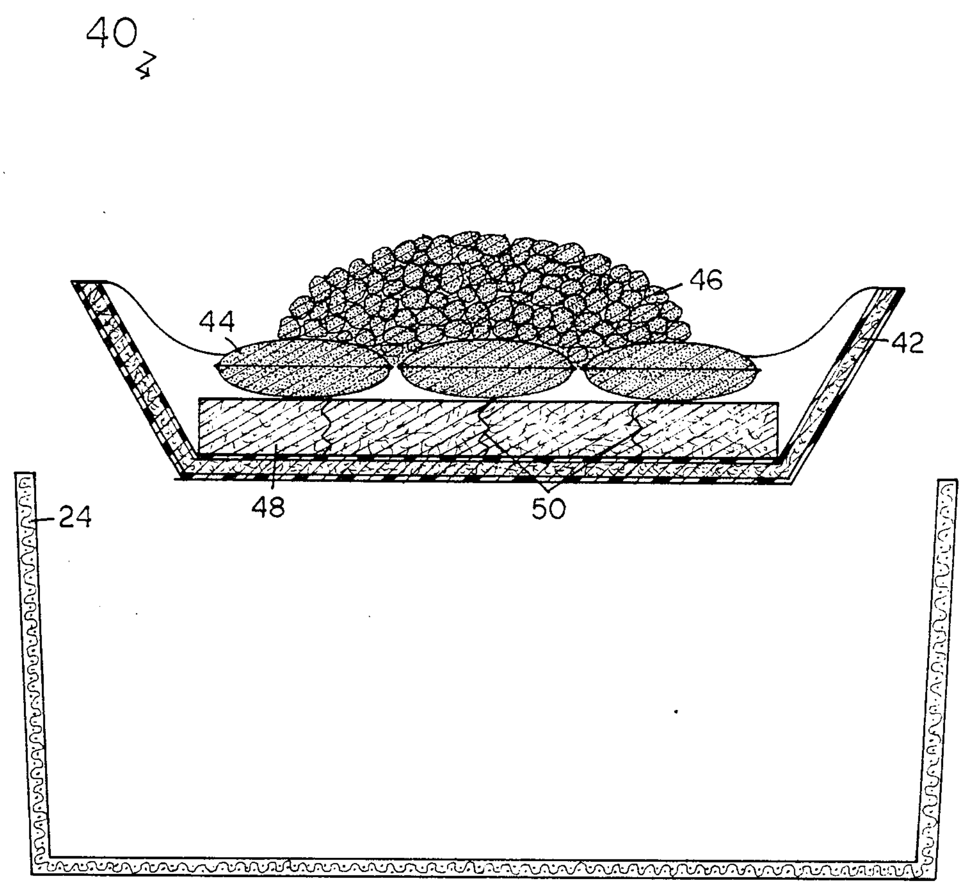
FIG. 3 is an illustrative sectional view of another ignition article of the invention.

FIG. 3 shows an ingition article 40 composed of an open top tray 42 of a paraffin wax impregnated sheet material; for example a 5T tray having contoured low sides and manufactured by keyes Fiber Company for use in packaging tomatoes, which tray, before wax impregnation weighed about 15 grams and after paraffin wax impregnation weiged about 80 grams, representing about 80 percent by weight of paraffin wax. The bottom of the tray contains a wax impregnated pressed wood fiber board material 48 which has been broken as illustrated by break lines 50. The tray 42 is shown positioned over and about to be placed in the open grate 24 of a coal stove. The charcoal briquettes 44 are wax impregnated, such as rounded Kingsford charcoal briquettes of about 2×2 inches which weigh about 30 grams or which contain about 33 percent by weight of paraffin wax. The charcoal briquettes 44 are shown on the top surface of the pressed board 48. However, when the article 40 is used to ignite a charcoal fire, the charcoal briquettes 44 are placed on the bottom of the tray 42. As shown, the ignition article 40 contains a layer of pea or nut coal 46 on the top of the charcoal briquettes.

In operation the article 40 is placed in the grate 24 and the edges of the sheet material forming the tray lit to ignite the sheet material and subsequently, the pressed wood 48, the charcoal briquettes 44 and the coal 46.

In the manner described a charcoal or lignite-type fire in a charcoal grill or a coal fire in a coal stove may be rapidly and efficiently started and maintained by the ignition composition and method of the invention.

What I claim is:

1. An article for the rapid ignition of a coal or charcoal fire, which article consists essentially of:

(a) a tray having upright sides and a bottom surface and composed of a stiff, combustible, cellulosic fibrous sheet material, the sheet material of the tray substantially uniformly impregnated with and containing a combustible amount of from about 30 to 90 percent by weight of a low melting point solid hydrocarbon combustible material;

(b) a pressed wood fiber board sheet material having a top surface, which sheet material substantially covers the bottom surface of the tray;

(c) a plurality of charcoal briquettes to be ignited, the briquettes forming at least a single layer of spaced-apart positioned briquettes, the layer placed on and covering substantially the top surface of the pressed wood fiber board sheet material; and (d) means to contain the tray and the layer of briquettes in positioned relationships.

2. The article of claim 1 wherein the combustible material comprises a paraffin wax.

3. The article of claim 1 wherein the tray is impregnated with and contains from about 40 to 75 percent by weight of paraffin wax.

4. The article of claim 1 wherein the tray is characterized by a plurality of separate spaced apart integrally formed cavities in the bottom surface of the tray, and the briquettes are positioned in said cavities to form the layer.

5. The article of claim 1 wherein the charcoal briquettes are impregnated with and contain a combustible amount of a solid hydrocarbon combustible material.

6. The article of claim 5 wherein the charcoal briquettes are impregnated with and contain from about 10 to 50 percent by weight of paraffin wax as the combustible material.

7. The article of claim 1 wherein the pressed wood fiber board material contains a small amount of paraffin wax.

8. The article of claim 1 wherein the pressed wood fiber board is characterized by holes or breaks therein.

9. The article of claim 1 which includes a layer of pea or nut coal on the top surface of the layer of briquettes.

10. The article of claim 1 wherein the means to contain comprises an adhesive to secure the briquettes in position within the tray.

11. The article of claim 1 wherein the means to contain comprises shaped depressed pocket-like cavities formed in the bottom surface of the tray to retain the individual briquettes in position in the cavities.

12. The article of claim 1 wherein the charcoal briquettes contain lignite.

13. An article for the rapid ignition of a coal or charcoal fire which article consists essentially of:

(a) a tray having upright sides and a bottom surface and composed of a stiff, formed, combustible, cellulosic fibrous sheet material, the sheet material substantially, uniformly impregnated with from about 30 to 90 percent by weight of a paraffin wax;

(b) a pressed wood fiber board sheet material having a thickness of about $\frac{1}{4}$ to 1 inch placed on the bottom surface in the tray;

(c) a plurality of charcoal briquettes to be ignited, the briquettes forming a layer of spaced apart briquettes on and substantially covering the top surface of the pressed wood fiber board material in the tray, the charcoal briquettes impregnated with and containing a paraffin wax; and (d) means to retain and contain the board material and charcoal briquettes within the tray.

14. The article of claim 1 wherein the pressed wood fiber board sheet material is characterized by a plurality of generally uniformly spaced holes therein to permit the rapid ignition of the sheet material.

15. The article of claim 1 wherein the pressed wood fiber board sheet material has admixed therein up to about 25 percent by weight of a combustible hydrocarbon wax material.

* * * * *